United States Patent
King (10) Patent No.: US 9,356,933 B2
(45) Date of Patent: May 31, 2016

(54) IMPLEMENTING POLICIES FOR AN ENTERPRISE NETWORK USING POLICY INSTRUCTIONS THAT ARE EXECUTED THROUGH A LOCAL POLICY FRAMEWORK

(71) Applicant: Clu Acquisition LLC, Sunnyvale, CA (US)

(72) Inventor: Gary King, Los Altos, CA (US)

(73) Assignee: NETAPP, INC., Sunnyvale, CA (US)

( * ) Notice: Subject to any disclaimer, the term of this patent is extended or adjusted under 35 U.S.C. 154(b) by 151 days.

(21) Appl. No.: 13/849,441

(22) Filed: Mar. 22, 2013

(65) Prior Publication Data

US 2013/0254834 A1  Sep. 26, 2013

Related U.S. Application Data

(60) Provisional application No. 61/614,883, filed on Mar. 23, 2012.

(51) Int. Cl.
*H04L 29/06* (2006.01)
*H04W 12/08* (2009.01)

(52) U.S. Cl.
CPC .............. *H04L 63/10* (2013.01); *H04L 63/107* (2013.01); *H04L 63/20* (2013.01); *H04W 12/08* (2013.01)

(58) Field of Classification Search
CPC ... H04L 63/20; H04L 63/102; H04L 63/0227; H04L 63/10; G06F 21/6218; G06F 21/604; G06F 17/3089
See application file for complete search history.

(56) References Cited

U.S. PATENT DOCUMENTS

| | | |
|---|---|---|
| 6,438,594 B1 | 8/2002 | Bowman-Amuah |
| 7,594,163 B2 | 9/2009 | Slack-Smith |
| 8,024,560 B1 | 9/2011 | Alten |
| 8,166,119 B2 | 4/2012 | Ligh et al. |
| 8,595,806 B1 | 11/2013 | Gabrielson |
| 8,973,108 B1 | 3/2015 | Roth |
| 2003/0046689 A1 | 3/2003 | Gaos |
| 2003/0167446 A1 | 9/2003 | Thomas |
| 2003/0231767 A1 | 12/2003 | Carbajal |
| 2004/0010620 A1 | 1/2004 | Salo |
| 2004/0044774 A1 | 3/2004 | Mangalik et al. |

(Continued)

FOREIGN PATENT DOCUMENTS

| | | |
|---|---|---|
| WO | 0193655 A2 | 12/2001 |
| WO | 2004068376 A1 | 8/2004 |

(Continued)

OTHER PUBLICATIONS

International Search Report and Written Opinion, mailed Dec. 28, 2012, for related application PCT/US2012/061721, filed Oct. 24, 2012, 10pages.

(Continued)

*Primary Examiner* — Carl Colin
*Assistant Examiner* — Ghodrat Jamshidi
(74) *Attorney, Agent, or Firm* — Mahamedi Paradice LLP (57) ABSTRACT

A policy framework is maintained on the computing device, and the computing device communicates with a policy server of an enterprise network over a network to receive a set of policy instructions. The policy instructions are executed through the policy framework in order to implement one or more policies that control the mobile computing device's access to resources of the enterprise network.

11 Claims, 6 Drawing Sheets

(56) References Cited

U.S. PATENT DOCUMENTS

| | | |
|---|---|---|
| 2004/0054750 A1 | 3/2004 | de Jong et al. |
| 2004/0162986 A1 | 8/2004 | Metzger |
| 2004/0230886 A1 | 11/2004 | Livshits |
| 2004/0236752 A1 | 11/2004 | Han et al. |
| 2005/0039116 A1 | 2/2005 | Slack-Smith |
| 2006/0184530 A1 | 8/2006 | Song et al. |
| 2006/0258341 A1 | 11/2006 | Miller |
| 2007/0156659 A1 | 7/2007 | Lim |
| 2008/0010457 A1 | 1/2008 | Lee |
| 2008/0216153 A1 | 9/2008 | Aaltonen |
| 2009/0063225 A1 | 3/2009 | Baeyens |
| 2009/0064346 A1 | 3/2009 | Larsson |
| 2009/0094596 A1 | 4/2009 | Kuiper |
| 2009/0125128 A1 | 5/2009 | Eldridge et al. |
| 2009/0172043 A1 | 7/2009 | Dullanty et al. |
| 2009/0210701 A1 | 8/2009 | Zhang |
| 2009/0254529 A1 | 10/2009 | Goldentouch |
| 2010/0005520 A1 | 1/2010 | Abbot et al. |
| 2010/0054465 A1 | 3/2010 | Asano |
| 2010/0064277 A1 | 3/2010 | Baird |
| 2010/0106965 A1 | 4/2010 | Ross |
| 2010/0115424 A1 | 5/2010 | Young et al. |
| 2010/0274646 A1 | 10/2010 | Townsend |
| 2011/0072036 A1 | 3/2011 | Agsen |
| 2011/0119738 A1 | 5/2011 | Piepenbrink |
| 2011/0145899 A1 | 6/2011 | Cao |
| 2011/0173188 A1 | 7/2011 | Walsh et al. |
| 2011/0231899 A1* | 9/2011 | Pulier et al. ............ 726/1 |
| 2011/0238501 A1 | 9/2011 | Almeida |
| 2012/0002813 A1 | 1/2012 | Wei |
| 2012/0017000 A1* | 1/2012 | Lim ............ 709/229 |
| 2012/0089668 A1 | 4/2012 | Berg |
| 2012/0204235 A1* | 8/2012 | Jaudon et al. .......... 726/4 |
| 2012/0260322 A1 | 10/2012 | Logan |
| 2013/0006845 A1 | 1/2013 | Kremen |
| 2013/0111343 A1 | 5/2013 | Ritter |
| 2013/0111542 A1* | 5/2013 | Shieh ............ 726/1 |
| 2013/0124616 A1 | 5/2013 | Bullotta |
| 2013/0191726 A1 | 7/2013 | Park |
| 2015/0143267 A1 | 5/2015 | Nair |
| 2015/0244781 A1 | 8/2015 | Agarwal |

FOREIGN PATENT DOCUMENTS

| | | | |
|---|---|---|---|
| WO | WO 2008/109866 A2 | | 9/2008 |
| WO | WO 2012/065127 A1 | | 5/2012 |
| WO | WO 2013/063138 A1 | | 5/2013 |
| WO | WO 2013/142849 A1 | | 9/2013 |
| WO | WO 2014063082 A1 * | | 4/2014 |

OTHER PUBLICATIONS

International Search Report and Written Opinion, mailed Mar. 16, 2012, for related application PCT/US2011/060466, filed Nov. 11, 2011, 15pages.

Office Action mailed Apr. 22, 2014, for related U.S. Appl. No. 13/393,204, filed Feb. 28, 2014, 10 pages.

International Search Report and Written Opinion, mailed Jun. 11, 2013, for related application PCT/US13/33614, filed Mar. 22, 2013, 11pages.

International Preliminary Report on Patentability for Application No. PCT/US2013/033614 mailed on Sep. 23, 2014, 8 pages.

Office Action mailed Sep. 8, 2015, for related U.S. Appl. No. 14/354,103, filed Apr. 24, 2014, 27 pages.

Office Action mailed May 1, 2015, for related U.S. Appl. No. 14/354,103, filed Apr. 24, 2014, 5 pages.

Office Action mailed Oct. 8, 2015, for related U.S. Appl. No. 14/155,229, filed Jan. 14, 2014, 19 pages.

International Preliminary Report on Patentability for Application No. PCT/US2011/060466 mailed on May 14, 2013, 8 pages.

International Preliminary Report on Patentability for Application No. PCT/US2012/061721 mailed on Apr. 29, 2014, 6 pages.

Supplementary European Search Report for Application No. EP11839083 mailed on May 9, 2014, 6 pages.

* cited by examiner

IMPLEMENTING POLICIES FOR AN ENTERPRISE NETWORK USING POLICY INSTRUCTIONS THAT ARE EXECUTED THROUGH A LOCAL POLICY FRAMEWORK

RELATED APPLICATION

This application claims priority to U.S. Provisional patent application No. 61/614,883, filed Mar. 23, 2012, entitled SYSTEMS AND METHODS FOR SECURE FILE STORAGE; the aforementioned priority application being hereby incorporated by reference in its entirety.

TECHNICAL FIELD

The disclosed embodiments relate to policy implementation and an enterprise network, and more specifically to implementing policies for an enterprise network using policy instructions that are executed through a local policy framework.

BACKGROUND

Enterprise networks provide various forms of remote access, such as through Virtual Private Network's (VPN). However, such networks are vulnerable to unauthorized access. The use of enterprise policies provides one mechanism for an administrator of a network to secure an enterprise network, while enabling remote access and connectivity.

DETAILED DESCRIPTION

Examples described herein relate to implementing enterprise policies on a computing device through the use of executable instructions that are communicated to computing devices that require access to the enterprise resources.

Among other benefits, examples such as described herein enable policies to be implemented for an enterprise network in a manner that is highly configurable for specific conditions or devices. For example, enterprise policies may be established that control the access of enterprise resources based on geographic location of the requesting device, time of request, or even the specific device making the request.

According to an embodiment, a policy framework is maintained on the computing device, and the computing device communicates with a policy server of an enterprise network over a network to receive a set of policy instructions. The policy instructions are executed through the policy framework in order to implement one or more policies that control the mobile computing device's access to resources of the enterprise network.

In another embodiment, policies are implemented on an enterprise network for computing devices that access the enterprise network. Information is determined about a computing device on which a policy framework is resident for accessing the enterprise network. A set of policy instructions are identified for the computing device based on the policy framework. The set of policy instructions are communicated to the computing device for execution by the policy framework of the computing device when the computing device accesses one or more resources of the enterprise network.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets), and magnetic memory. Computers, terminals, and network-enabled devices (e.g. portable devices such as cell phones) are all examples of machines and devices that use processors, memory, and instructions stored on computer-readable mediums.

System Overview

Figure 1:
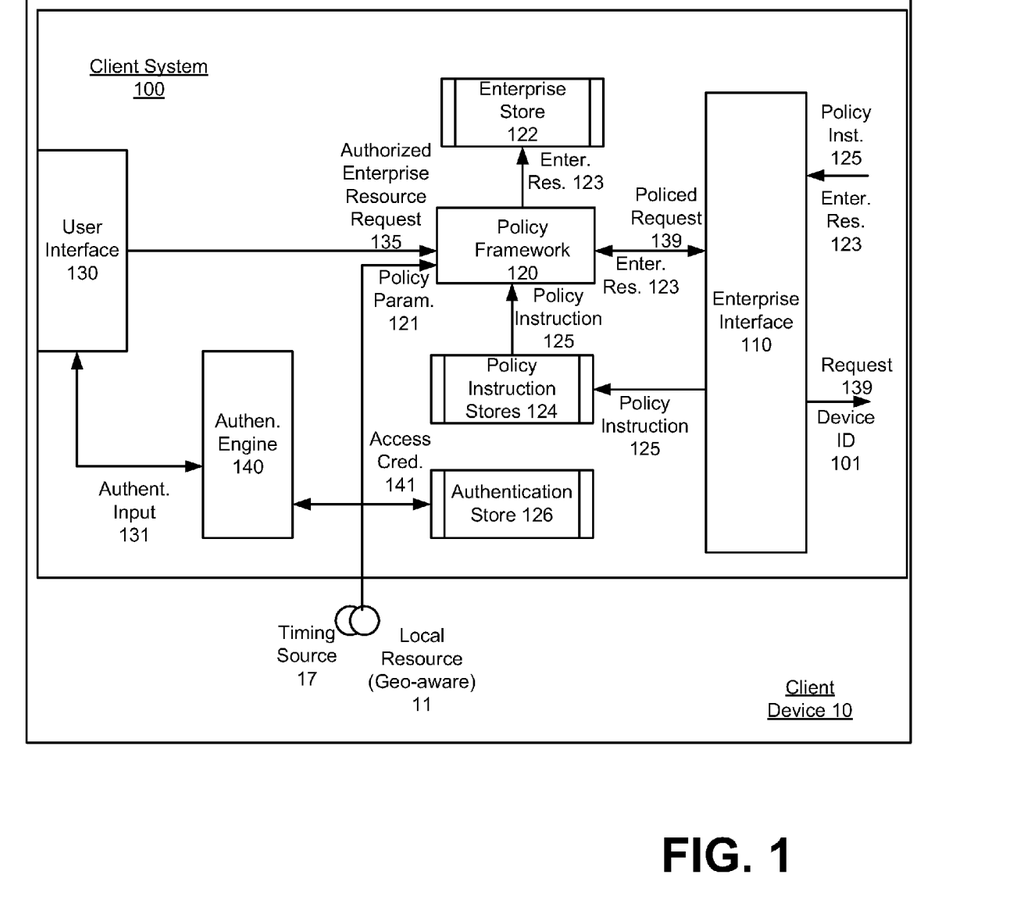
FIG. 1 illustrates a client-side system in which policy instructions are received from the enterprise network and executed on a client system in order to implement enterprise policies that control a computing device's access to the resources of the enterprise network, according to an embodiment.

FIG. 1 illustrates a client system in which policy instructions are received from an enterprise network and executed on the client system in order to implement enterprise policies that control a client computing device's access to the resources of the enterprise network, according to an embodiment. According to some embodiments, a client system 100 implements policies that control both online and offline access by the client computing device 10 to resources of the enterprise network.

The client system 100 can be implemented on a variety of computing device platforms, including, for example, devices that are capable of roaming connections and/or which are mobile. By way of example, client system 100 can be implemented on a computing device that corresponds to a personal computer, laptop, tablet, mobile computing device (e.g., cellular telephony/data device) or other computing form factors or platforms that are capable of networking connections with an enterprise network. As used herein, a roaming device refers to a computing device that is capable of establishing a wireless network connection with an enterprise network from different points of a wide area network, such as the Internet. Furthermore, a device may be deemed to have "offline" access to an enterprise network if the client computing device can utilize resources from the enterprise network without actually being connected to the enterprise network. Similarly, the client computing device may be deemed to have "online" access to an enterprise network if it is actively connected to the enterprise network.

With further reference to an example of FIG. 1, client system 100 includes an enterprise interface 110, a policy framework 120, a user interface 130, and an authentication engine 140. The components of client system 100 can be installed on a computing device, such as, for example, as an application, or as application layer logic. In variations, client system 100 can operate as a lower level component, such as an operating system level component. The policy framework 120 can correspond to a programmatic component that executes policy instructions that are communicated from an enterprise network 201 (see FIG. 2). In some embodiments, the policy framework 120 functions only in connection with policy instructions 125, which correspond to programmatic code (e.g., JavaScript). For example, policy framework 120 can include a JavaScript engine resident on the client computing device 10, which executes JavaScript code that corresponds to specific enterprise policies. As described with other examples, the policy instructions 125 may originate from the enterprise network 201 to control access of enterprise resources. Among other benefits, the execution of policy instructions 125 by the policy framework 120 enables enterprise policies to be implemented on the computing device that are highly specific to, for example, specific conditions or events, the computing device or user (or user class), as well as the resource being accessed.

In one embodiment, the enterprise interface 110 connects to and interfaces with enterprise network 201 when the client system 100 is online. In implementing enterprise access, client system 100 may implement an authentication process to ensure access to the client system 100 and/or enterprise network 201 is authorized. In one embodiment the client system 100 is associated with a device identifier 101 that is communicated by the client system 100 (via enterprise interface 110) to the enterprise network 201. The client system 100 (or the computing device 10 on which the client system 100 is installed) may also implement a login process that controls access to the client system 100. In this way, both the user and the computing device 10 can be authenticated before access to the enterprise network 201 is permitted. Authentication information and data, such as provided by the device identifier 101 and/or login information (authentication input 131), may be stored in the authentication store 126. The authentication store 126 can also include values derived from the authentication input 131. For example, an encryption key can be generated from authentication input that encrypts a known verification phrase, and the resulting encrypted value can be stored in the authentication store 126.

The enterprise interface 110 may receive policy instructions 125 when the client system 100 is online. For example, during an enterprise network session, the enterprise interface 110 may receive policy instructions 125 that regulate future access of the enterprise network, or of a particular enterprise resource contained therein. A policy instructions store 124 may retain the policy instructions 125. The policy framework 120 may access the policy instructions 125 from the store 124 in order to implement one or more policies for requesting resources from the enterprise network 201. Some embodiments permit for the policy framework 120 to execute the policy instructions 125 non-discriminatorily over a given duration of time (e.g., as specified by the policy instructions 125). Additionally, some embodiments provide for the policy framework 120 to execute the policy instructions 125 selectively, such as in response to certain events or conditions. For example, in one implementation, policy parameters 121 may be determined from local resources 11 of the computing device 10. The local resources 11 can include, for example, hardware resources of the computing device 10. By way of example, policy parameters 121 can correspond to one or more of the following: (i) geographic parameters that are determined from geo-aware resources of the computing device 10 (e.g., Global Positioning System (GPS) coordinates as determined from GPS resource of computing device 10; cellular base station information, etc.); (ii) a parameter that identifies information about a port in use on the computing device, such as whether the port is wireless (e.g., WiFi (e.g., 802.11(a), (b), (g) or (n), cellular, WiMax) or physical, whether it is public or secure or otherwise known); (iii) a microphone input (e.g., use voice recognition to authenticate); and/or (iv) camera input (e.g., use of QR Codes or barcode). As an alternative or addition, policy parameters 121 can be dynamic, in that they may be determined on-the-fly, such as in response to an enterprise connection being made or being active.

As an addition or alternative, the policy parameter 121 could be based on a timing source 17. The timing source 17 can correspond to either a local or remote clock resource. In particular, the timing source 17 can be determined from one or more sources that include: (i) a local clock on the computing device 10 and accessible to the client system 100, (ii) an enterprise clock, determined at the enterprise network (e.g., when the request is made), and/or (iii) a general network clock, determined from, for example, a network source or location.

In this way, policy instructions 125 may utilize specific policy parameters 121 that are determined from the local resources 11 of the computing device 10. The policy instructions 125 can then be executed to implement, for example, policies that are specific to a geographic location, or a period of time. In similar fashion, policy instructions 125 can utilize other forms of local resources 11 in order to implement policies that are subject to various other conditions or events, as determined from local resources 11 of the computing device 10. Moreover, the policy implementation for the client system 100 can be made geographical, and more specifically, specific to a current location of the client system 100. For example, a roaming device may be carried from one location to another, and with the change in the location, the specific policies that are applicable to the device at the present location may change. The change in location can affect what enterprise resources the user can access locally and/or over the network. In this respect, the client system 100 can implement enterprise policies that are geo-fenced.

According to an embodiment, a user may operate the client system 100 by interacting with the user interface 130. In order to preserve a secure environment, the user interface 130 may require the user to perform the login process based on a local authentication policy. The login process can be determined from policy instructions 125 that are executed to the policy framework 120, or inherent as part of client system 100. The user may provide authentication input 131 (e.g., login information) through the user interface 130, and the authentication input 131 may be received by authentication engine 140. The authentication engine 140 may compare access credentials 141 (as determined from the authentication input 131) with information stored in the authentication store 126 in order to authenticate the user. Once the user is authenticated, an authorized enterprise resource request 135 can be made from the client system 100. In one implementation, authorized enterprise resource request 135 is based on the user input or requests, made through the user interface 130 when the user is authenticated. In variations, the enterprise network 201 can communicate tokens or "nonces" which are encrypted and used by the client system 100 to perform cryptographic operations which protect enterprise data stored on the data (e.g., view locally stored document from enterprise).

According to some embodiments, the request 135 can be processed through the policy framework 120 of the client system 100, which can permit or deny the request based on policies that are implemented by a current set of policy instructions 125. The request 135 can be either for locally stored enterprise resources or for enterprise access and remotely provided enterprise resources. For example, a request for a locally stored enterprise resource can be made when the client system 100 is offline, and the request for enterprise access can be made when the client system 100 is online. In the online case, a user's request that is permitted can be forwarded on to the enterprise network 201 as a policed enterprise request 139 via the enterprise interface 110. In some cases, the policed request 139 can result in an enterprise resource 123 being returned and locally stored on the client system 100. In one implementation, the enterprise store 122 can store the enterprise resource 123. In the offline case, a user's request that is permitted can result in a local process that yields a resource previously obtained from the enterprise network 201. When the user's request is not permitted, the policy framework 120 can preclude the user from accessing the enterprise network 201, or alternatively, preclude the user from accessing a locally stored resource thereof. By way of example, a user's request for access to an enterprise resource (e.g., enterprise document) that is locally stored can be subjected to timing conditions that are implemented by the policy framework 120, using a corresponding set of policy instructions 125. For example, if the users request is made too late, the user's request to access the enterprise resource may be denied.

Figure 2:
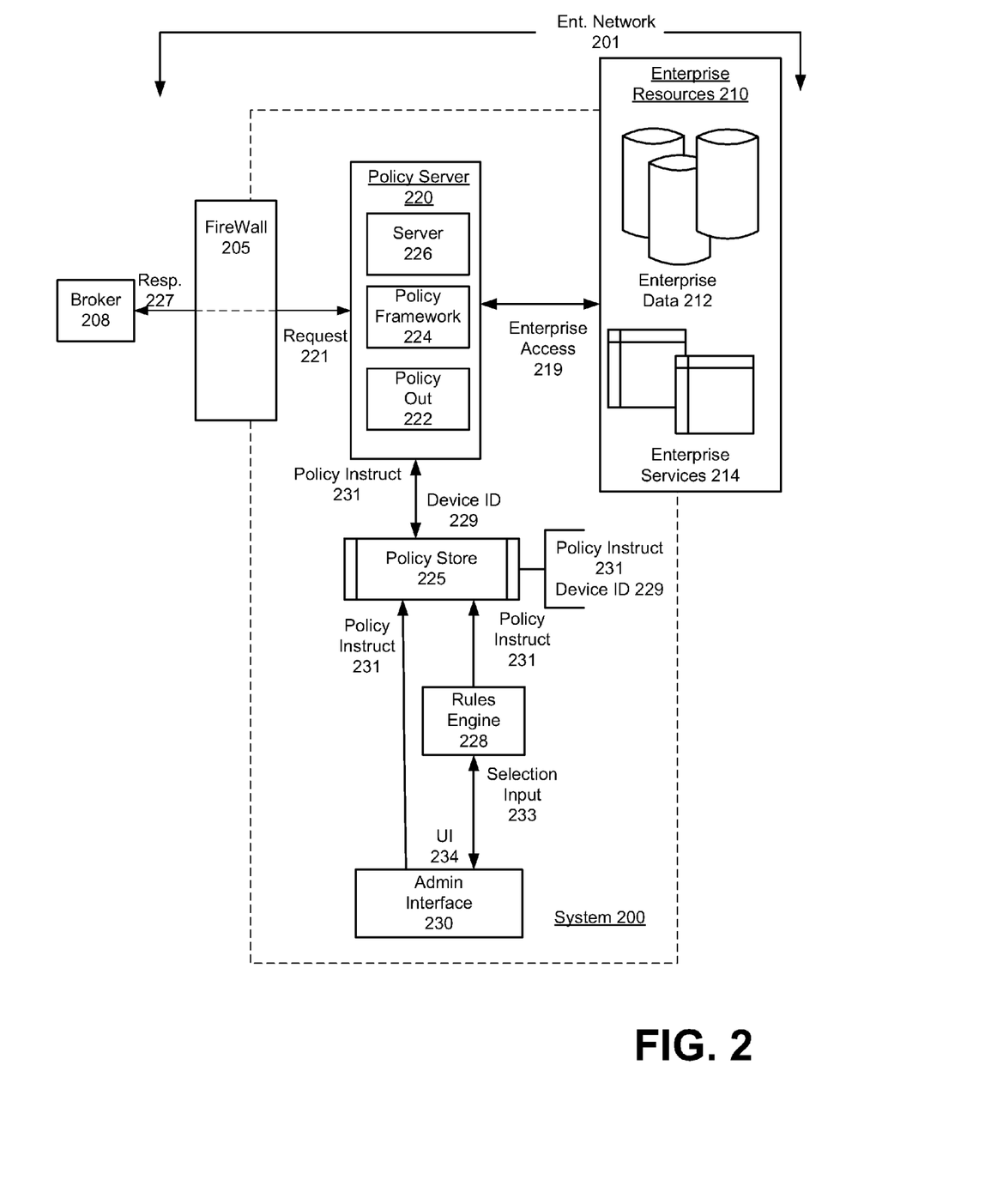
FIG. 2 illustrates a network-side system for providing policy instructions to a client system, according to an embodiment.

FIG. 2 illustrates a network-side system for providing policy instructions to a client system, according to an embodiment. In particular, FIG. 2 illustrates an example of a network system 200 that operate as part of an enterprise network 201, in order to generate and communicate policy instructions to client system 100 for purpose of implementing one or more enterprise policies for controlling access of enterprise resources by the client system 100.

With reference to FIG. 2, system 200 includes a policy server 220, a rules engine 228 and an administrator interface 230. In one implementation, the policy server 220 of system 200 can reside behind a firewall 205 of the enterprise network 201, and can communicate with a network broker 208. In turn, the network broker 208 can communicate with the client system 100, such as illustrated by an example of FIG. 1. The administrator interface 230 enables an administrator to enter input for creating or specifying policy instructions, corresponding to programmatically executed code such as expressed through JavaScript. In one implementation, the administrator interface 230 enables the administrator to enter input corresponding to (i) a device identifier (or class thereof) 229, and (ii) policy instructions 231. In another implementation, the rules engine 228 can generate a user interface 234 that can be provided through the administrator interface 230. The user interface 234 can provide, for example, a selection menu, from which the administrator can provide selection input 233. The rule engine 228 converts the selection input 233 into the device identifier 229 and policy instructions 231.

The policy instructions 231 can be stored in the policy store 225. The policy instructions 231 can be stored in association with the corresponding device identifier 229, where the device identifier 229 corresponds to the client device 10 on which client system 100 (see FIG. 1) is implemented. In this way, different policy instructions 231 can be generated for a wide number of devices, device types, or users. As each client system 100 executes policy instructions 231, variations amongst different client systems can exist as to specific enterprise policies that are implemented. This enables more flexibility in the manner in which enterprise policies are implemented, as compared to, for example, conventional approaches in which end devices are provided a common application that can have some variations based on device or user class etc.

According to an embodiment, the policy server 220 can include a policy output component 222, a policy framework 224, and a server 226. The policy output component 222 can communicate instructions from the policy store 225 to specific devices based on device identifiers communicated by the individual devices when those devices initiate respective online sessions with the enterprise network 201. In one implementation, the policy output component 222 signals a set of JavaScript code corresponding to policy instructions 231 for a specific device when that device connects to the enterprise network 201.

The policy server 220 is able to use the policy store 225 to determine what policy instructions 231 are in effect for the client system 100 that connects to the enterprise network 201. The policy framework 224 of the server 220 can independently approve or deny the incoming request 221. In one implementation, the policy framework 224 may determine the device identifier 101 (see FIG. 1) associated with the incoming request 221, and use a device identifier 229 (which can be included in the request from the computing device) to retrieve the corresponding set of policy instructions 231 from the policy store 225 for the client device 10. The policy framework 224 may execute the policy instructions 231 in order to implement one or more policies that are specific to the requesting device. In one implementation, the policy framework 224 executes the instructions before the request of the requesting client system 100 is granted. In another variation, the policy framework 224 executes the instructions when the client system 100 makes a connection request to initiate an online session with the enterprise network 201.

Still further, in one embodiment, the policy framework 224 implements the policy instructions 231 independently of the same set of instructions that are executed on the policy framework 120 (See FIG. 1) of the requesting client system 100. Thus, the policy framework 224 can be implemented as a redundant or duplicative policy implementation component that controls the access of the enterprise network 201 by individual client systems 100, when the devices connect to the enterprise network 201 or request resources from the enterprise network.

The server 226 can respond to authorized requests from the client system 100. In one implementation, the server 226 responds to request 221 if the device or request is approved by the policy framework 220. In responding to the request 221, the server 226 can access 219 various kinds of enterprise resources in responding to the incoming request, and provide a response 227 that includes or provides access to a specific enterprise resource. By way of example, the enterprise resources 210 can include enterprise data resources 212 and enterprise services 214. The type of access that can be granted to a requesting client system 100 can include session-based access, such as when the client system 100 can access a particular client resource so long as there is online (e.g., connected to the enterprise network 201), or offline access, which can enable a copy or version of a resource to be delivered to the client device 10.

Methodology

Figure 3:
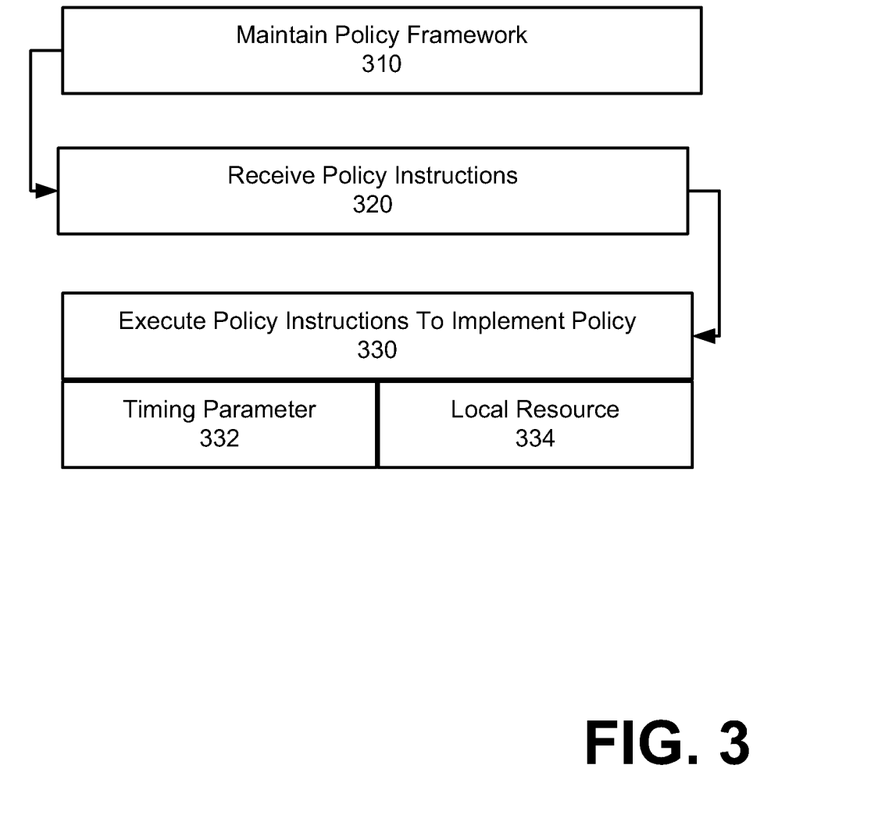
FIG. 3 illustrates a method for using policy instructions to implement enterprise policies that control a computing device's access to enterprise resources, according to an embodiment.

FIG. 3 illustrates a method for using policy instructions to implement enterprise policies that control a computing device's access to enterprise resources, according to an embodiment. An example such as described by FIG. 3 may be implemented using components described with a client system such as described with an example of FIG. 1. Accordingly, reference may be made to elements of FIG. 1 for purpose of illustrating suitable components or functionality for performing a step or sub-step being described.

In FIG. 3, a computing device that is used to access an enterprise network may include a policy framework that includes functionality for executing programmatic code corresponding to enterprise policies (310). In one embodiment, the policy framework serves as a functional container or engine for executing scripts corresponding to policy instructions. The policy framework can be downloaded onto a computing device, such as a roaming or mobile computing device, which has intermittent access to a corresponding enterprise network. In one implementation, the policy framework may be maintained as a programmatic element residing on a roaming device (e.g., tablet or mobile computing device), and the programmatic element may trigger a sequence in which the enterprise network delivers scripts or other programmatic instructions that correspond to policies that are to be implemented on a device in regards to the ability of that device to access the enterprise network at a particular instance.

A computing device that utilizes the policy framework may subsequently receive policy instructions from the enterprise network 201 (320). In some implementations, scripts or other programmatic instructions may be received from the enterprise network in response to an attempted activity of the computing device. For example, when the computing device attempts to connect to the enterprise network 201, a set of policy instructions may be delivered to the device. In other variations, the programmatic instructions may be pushed to the computing device based on that device is identifier. Still further, the policy instructions may be downloaded from the website, or delivered to the computing device through some other mechanism.

The policy instructions may be executed to implement one or more policies that control the computing device in its access or use of enterprise resources (330). The implemented policies may regulate a current session in which the client computing device 10 connects to the enterprise network 201, and the policies implemented by the policy instructions may expire after the session is over. In a variation, the policy instructions policies that are in force on the client computing device 10 until the policy server 220 signals a change. Still further, the policy instructions may be (i) timed out after duration of time, (ii) in effect for a particular resource (e.g., for SharePoint access, for a particular folder, or a service such as e-mails), (iii) in effect for locally stored resources of the enterprise network, and/or (iv) in effect at some point in the future, such as the next time the user connects to the enterprise network 201. Numerous such variations are possible, particularly in how and when the policy instructions can be implemented for the client computing device 10.

In some embodiments, the policy framework 120 executes the policy instructions using information determined from a timing parameter (332). The timing parameter can be determined from a local or network source. For example, the computing device 10 may be granted access to a locally stored resource of enterprise network only for a duration of time following a previous access request from the same device. Thus, for example, the user can download a document from the enterprise resource 210, and the user's local access to the document can be controlled by a policy that is set to the clock of the computing device 10.

In another implementation, the policy framework 120 executes the policy instructions using information determined from a local resource (e.g., hardware resource) of the client computing device 10 (334). In particular, the local information can serve as a policy parameter 121 that is utilized in the implementation of the policies on the computing device. By way of example, the local information can include a geo-aware parameter, such as a coordinate retrieved from a GPS resource resident on the computing device. Such local information can be used to implement policies that are geographic specific, or geo-fenced. For example, a user's access to the enterprise network 201 may be regulated based on which state the user is resident (assuming the user is in the United States). Alternatively, a user's access to the enterprise network 201 may be regulated based on which country the user is resident in. For example, in Europe, a user can traverse the borders of different countries easily, and each country may have different regulations or security concerns that impact how the enterprise network may make its resources available.

Figure 4:
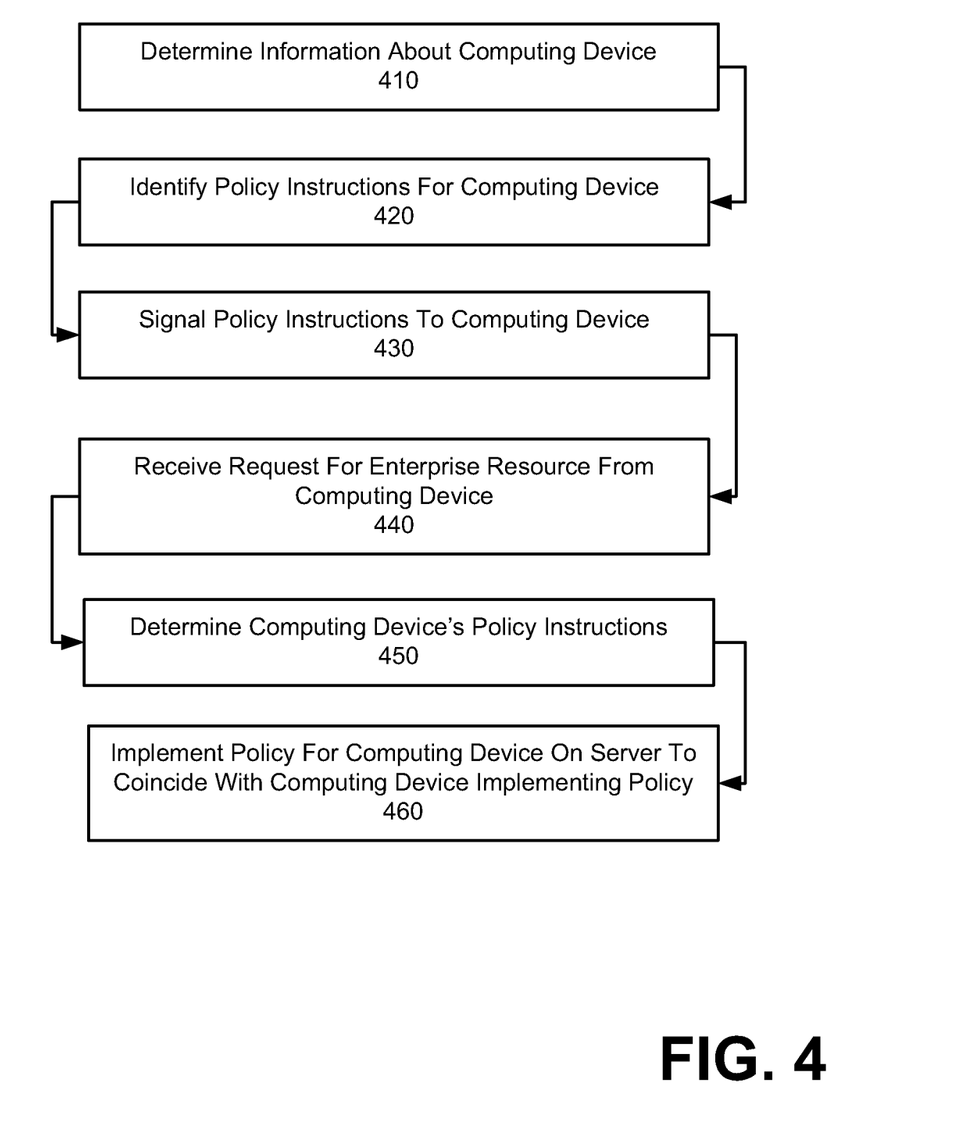
FIG. 4 illustrates a method for using executable policy instructions in order to implement enterprise policies from a network, according to an embodiment.

FIG. 4 illustrates a method for using executable policy instructions in order to implement enterprise policies from a network, according to an embodiment. An example such as described by FIG. 4 may be implemented using components described with a network-side system such as described with an example of FIG. 2. Accordingly, reference may be made to elements of FIG. 2 for purpose of illustrating suitable components or functionality for performing a step or sub-step being described.

According to an embodiment, information is determined about a computing device that is to use the enterprise network (410). The information can include the identifier 101 (See FIG. 1) of the client computing device 10. The identifier of the device can be used for an authorization and authentication process, particularly if the client system 100 includes additional security measures (such as login and password) to authenticate the user of the device.

The policy instructions for a computing device are identified (420). Specifically, and administrator may determine policy instructions for device (e.g., based on the user or device). The administrator may specify policies for the device based on factors such as, whether the device is secure, the form factor of the device, the operating system of the device, as well as other information pertaining to the class of the user of the device etc. Based on the identifier of the device, one embodiment provides for the policy instructions for that computing device to be retrieved from, for example, a policy store. As mentioned with an example of FIG. 2, the policy instructions 231 can be generated from input by an administrator (e.g., selection input made through a rules engine 228, scripts or other programmatic instructions communicated directly from administrator etc.).

The policy instructions may be signaled to the computing device (430). For example, a set of JavaScript code can be communicated to the computing device 10 when the computing device connects to the enterprise network 201. In a variation, the set of JavaScript code can be pushed to the computing device 10. Other transport mechanisms for delivering JavaScript code to the computing device 10 can also be used, such as making the JavaScript available as a file that the user of the computing device 10 can retrieve from a network location or source.

A request for an enterprise resource can be received from the computing device (440). The resource can be received after the policy instructions are communicated to the computing device. Alternatively, policy instructions can be communicated to the device as part of the policy server 220 responding to the user's request for access to an enterprise resource.

In either case, when the computing device 10 makes the request for the enterprise resources, the policy server 220 independently retrieves the policy instructions 231 that are applicable to the computing device's request (450). The retrieval can be based on information contained in the request, including the device identifier 101.

The retrieved instructions are then executed on the policy server 220 in order to determine what policies are implemented for the computing device 10 (460). Thus, the policy server 220 can independently determine the policies of the requesting device 10, using the same set of policy instructions 231 that were previously communicated to the requesting computing device 10.

Computer System

Figure 5:
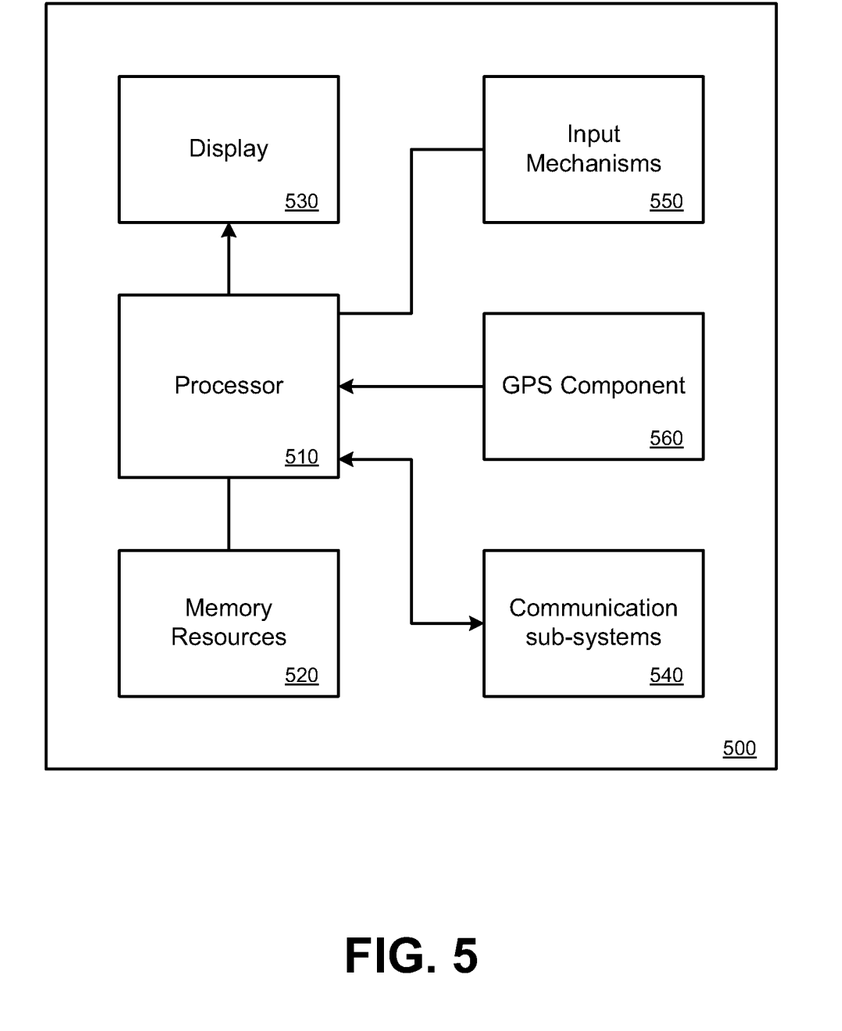
FIG. 5 is a block diagram that illustrates a computer device on which an embodiment such as described with FIG. 1 or FIG. 3 may be implemented.

FIG. 5 is a block diagram that illustrates a computer device on which an embodiment such as described with FIG. 1 or FIG. 3 may be implemented. By way of example, a computing device 500 can correspond to a roaming device, such as a mobile computing device, tablet or laptop that can connect to an enterprise network from multiple points on the Internet. According to some embodiments, the computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more location detection mechanisms (e.g., GPS component) 560. In one example, at least one of the communication sub-systems 540 sends and receives cellular data over data channels and voice channels.

The processor 510 is configured with software and/or other logic to perform one or more processes, steps and other functions described with implementations, such as described by FIG. 1 or FIG. 3, and elsewhere in the application. An end user can operate the computing device 500 to obtain access to enterprise resources in accordance with policy instructions that are executed on the computing device 500, but specified by the administrator of the enterprise. Accordingly, the instructions can be specific to the device, the class of the device, the time, the geographic location of the device, and/or other parameters.

Figure 6:
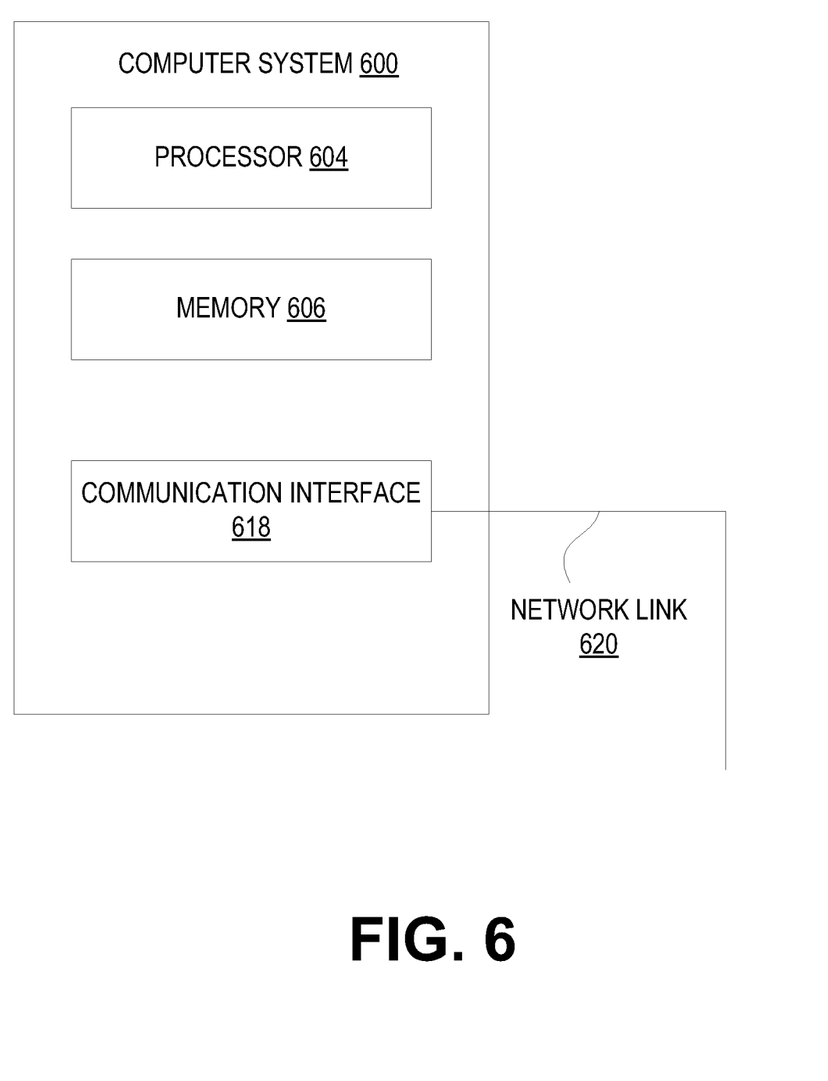
FIG. 6 illustrates a computing system on which a network-side system such as described with FIG. 2 or provided with a method of FIG. 4 can be implemented.

FIG. 6 illustrates a computing system on which a network-side system such as described with FIG. 2 or provided with a method of FIG. 4 can be implemented. In an embodiment, computer system 600 includes processor 604, memory 606 (including non-transitory memory), storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. A storage device 610, such as a magnetic disk or optical disk, is provided for storing information and instructions. The communication interface 618 may enable the computer system 600 to communicate with one or more networks through use of the network link 620 (wireless or wireline).

In one implementation, memory 606 may store instructions for implementing functionality such as described with an example of FIG. 2, or implemented through an example method such as described with FIG. 4. Likewise, the processor 604 may execute the instructions in providing functionality as described with FIG. 2, or performing operations as described with an example method of FIG. 4.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for implementing enterprise policies on a computing device, the method being implemented by one or more processors and comprising:
   maintaining a policy framework on the computing device;
   communicating with a policy server of an enterprise network to receive policy instructions; and
   storing, on the computing device, resources downloaded from the enterprise network,
   wherein, in response to detecting that the computing device is not connected to the enterprise network, the computing device executes the policy instructions through the policy framework in order to implement one or more policies that control the computing device's access to the resources downloaded from the enterprise network based on a current geographic location of the computing device determined by geo-aware resources of the computing device.

2. The method of claim 1, wherein the policy instructions are specific to the computing device, so that the computing device implements a policy that is specific to that device.

3. The method of claim 1, wherein the policy instructions are specific to a user of the computing device, so that the computing device implements a policy that is specific to a user of that computing device.

4. The method of claim 1, wherein executing the policy instructions includes executing the policy instructions to implement a policy that is specific to a particular geographic region.

5. The method of claim 1, wherein executing the policy instructions includes executing Javascript code on the computing device.

6. The method of claim 1, further comprising receiving the policy framework from a resource that is controlled by the policy framework.

7. The method of claim 1, wherein executing the policy instructions includes:
   (i) determining one or more policy parameters from one or more local resources of the computing device;
   (ii) accessing the enterprise network to request a resource; and
   (iii) executing a policy instruction that controls access to the requested resource based at least in part on the one or more policy parameters.

8. The method of claim 7, wherein determining the one or more policy parameters includes determining a timing parameter, and wherein executing the policy instruction is based at least in part on the timing parameter.

9. The method of claim 7, wherein determining the one or more policy parameters includes determining a dynamic parameter at a time when the resource is requested from the enterprise network.

10. The method of claim 1, wherein executing the policy instructions is performed in response to the computing device requesting access to a resource of the enterprise network.

11. A non-transitory computer-readable medium to store instructions for implementing enterprise policies on a computing device, the instructions being executable by one or more processors of the computing device to perform operations comprising:
   maintaining a policy framework on the computing device;
   communicating with a policy server of an enterprise network to receive policy instructions; and
   storing, on the computing device, resources downloaded from the enterprise network,
   wherein, in response to detecting that the computing device is not connected to the enterprise network, the computing device executes the policy instructions through the policy framework in order to implement one or more policies that control the computing device's access to the resources downloaded from the enterprise network, based on a current geographic location of the computing device determined by geo-aware resources of the computing device.

* * * * *